Jan. 12, 1926.  1,569,240
R. R. SEARLES
VEHICLE SPRING BEARING
Filed Feb. 7, 1925

INVENTOR
R. R. Searles
BY
ATTORNEYS.

Patented Jan. 12, 1926.

1,569,240

UNITED STATES PATENT OFFICE.

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

VEHICLE SPRING BEARING.

Application filed February 7, 1925. Serial No. 7,640.

*To all whom it may concern:*

Be it known that I, RAYMOND R. SEARLES, a citizen of the United States of America, residing at New Britain, Connecticut, have invented a new and useful Vehicle Spring Bearing, of which the following is a specification.

My invention relates to a vehicle spring bearing and particularly to an anti-friction bearing for the so-called hinge end of a vehicle spring.

The usual method of connecting a vehicle spring to the frame is by means of a pin secured to the frame and extending through the spring eye or a bushing positioned therein. Since the relative rotative or oscillating movement between the bearing pin and its surrounding bearing surface is so very slight, it is exceedingly difficult to lubricate these surfaces and consequently the surfaces are subject to rapid wear and require frequent replacement.

It is an object of the invention to provide a novel form of anti-friction bearing for a vehicle spring which bearing requires very infrequent lubrication, and which will be cheap to manufacture and easy to assemble. Other minor objects will be apparent as the specification proceeds.

Briefly stated, in the preferred form of the invention, the vehicle frame is provided with pins extending inwardly from the outer spaced apart portions or legs of the frame. The eye of the spring extends over these pin ends and anti-friction bearing members are interposed between the pin ends and the spring eye. It is desirable to provide bearing cups within the spring eye and also to so form the bearing that both radial and thrust loads will be taken so as to position the spring eye in the frame and prevent all but rotative movement between these two parts.

In the drawings I have shown for illustrative purposes only, preferred forms of the invention. In said drawings—

In said drawings, 5 indicates a portion of a vehicle frame and in the form shown is the horn which is at the front or rear end of a vehicle. 6 indicates a conventional type of leaf spring for connection to the frame.

Figure 1:
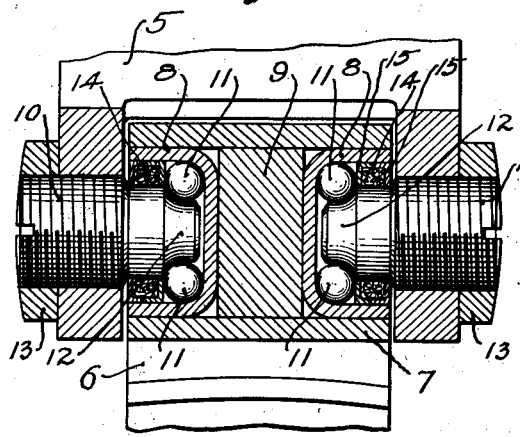
Fig. 1 is a sectional view through a vehicle spring bearing embodying features of my invention, the section being taken in the plane of the line 1—1 of Fig. 2.
Figure 2:
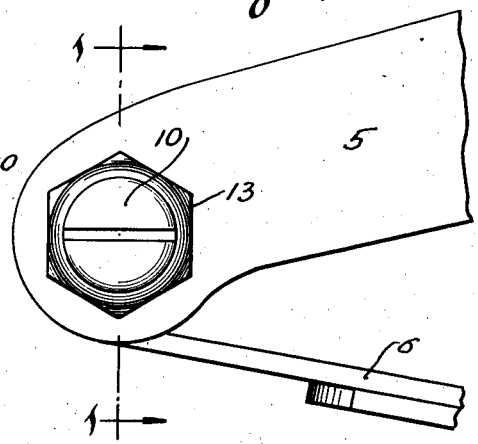
Fig. 2 is a fragmentary view in side elevation of a vehicle frame and spring connected by the bearing shown in section in Fig. 1.

In the form of the invention shown in Fig. 1 the spring is provided with a spring eye 7 and in this spring eye are bearing surfaces to receive anti-friction bearing members. Instead of permitting the anti-friction bearing members, to be later mentioned, to bear directly upon the inner surface of the spring eye, I preferably provide anti-friction bearing member raceways or rings which may be in the form of cups 8—8 seated in the spring eye. With cups as shown in Fig. 1, it is desirable to provide some means for positively spacing the cups apart and with that end in view a spacer block 9 may be interposed between the rear sides of the bearing cups 8—8.

Bearing pins 10—10 are secured to the spaced apart portions or legs of the frame and in the preferred form shown a portion of each pin is threaded and takes into a corresponding threaded aperture in the spaced apart portions of the frame. Anti-friction bearing members which may be in the form of balls 11—11 are interposed between the bearing surfaces of the cups 8—8 and the ends of the bearing pins and for the sake of cheapness and simplicity it is desirable to form the bearing surfaces for the balls 11—11 directly upon the pin ends as indicated at 12—12.

When the pins 10—10 are screwed in to the desired point so as to form the proper bearing contact between the balls and the bearing surfaces, lock nuts 13—13 may be screwed up so as to hold the pins in proper predetermined positions.

In order to exclude dust, water and the like and to retain lubricant on the bearing surfaces, I may insert closures or dust rings in the spaces between the outer ends of the spring eye and the inwardly projecting pins. One form of such dust ring may include a felt washer 14 held between metallic or other plates 15—15 as indicated in Fig. 1.

Figure 3:
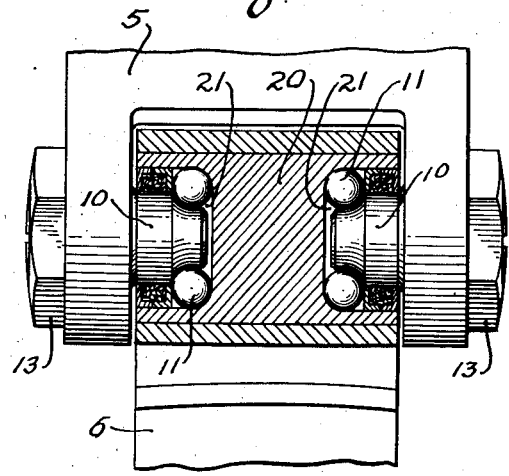
Fig. 3 is a view similar to Fig. 1 but illustrating a modification.

The modification shown in Fig. 3 is in all substantial respects the same as that shown in Fig. 1 except in regard to the bearing surfaces within the spring eye. In the form shown in Fig. 3, I employ a block or cylinder 20 having bearing cups 21—21 formed directly in the ends thereof. These bearing cups 21—21 serve the same purpose and act substantially the same as the separate bearing cups described in connection with Fig. 1. It will, of course, be obvious that with a construction as shown in Fig. 3, no separate spacer for the cups is required, since the cups and spacer are formed integrally of one piece.

Figure 4:
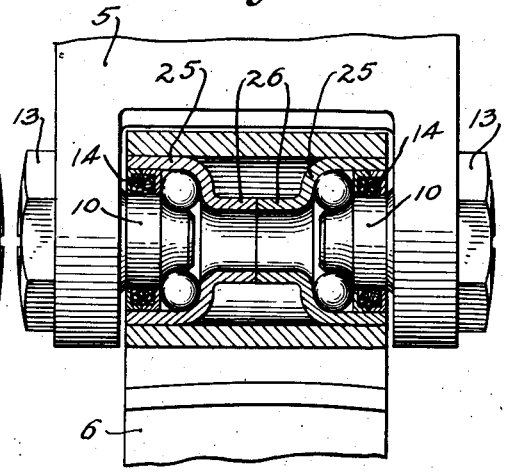
Fig. 4 is a view similar to Fig. 1 showing still another modification.

In the form shown in Fig. 4, the bearing cups 25—25 preferably extend to the outer edges of the spring eye, as in previous forms, but the rear ends of the cups instead of being closed are open and are provided with tubular extensions 26—26 which may abut each other and thus serve as spacing means for the cups 25—25.

The invention shown in Fig. 4 has the advantage over the two previous forms of having a substantial reservoir in the tubular extensions between the two cups for holding a substantial quantity of grease or other lubricant.

The operation and method of use of all three forms are substantially the same. It will be seen that the cups or bearing members shown in Figs. 1 and 4 may be struck up from sheet metal and therefore made at comparatively small cost. It will also be obvious that the bearing surfaces for the anti-friction bearing members should be hardened locally or throughout to resist wear. In each of the forms disclosed, the lines joining the bearing surfaces between the anti-friction bearing members and the pins and cups converge outwardly so that the bearings are so formed as to take both radial and thrust loads, so that the spring will be held against sidewise, as well as all other motion, except oscillation relatively to the frame.

While the invention has been described in detail, and three forms shown, I do not wish to be limited to the disclosures in this application, since many modifications may be made within the scope of the invention as defined in the appended claims.

I claim:

1. In a vehicle spring bearing and in combination with a vehicle frame and spring, said frame having spaced apart portions with apertures therein, bearing pins secured in said apertures and extending toward each other, said spring having an eye thereon, means within said spring eye including bearing cups extending over said inwardly projecting pin ends and anti-friction members between said cups and pin ends.

2. In the combination defined in claim 1, said pin ends having anti-friction raceways for said anti-friction members formed directly thereon.

3. In a device of the character described and in combination with a vehicle frame and spring, said frame having spaced apart portions, pins secured to said spaced apart portions and extending inwardly therefrom, said spring having an eye thereon and anti-friction members interposed between said pins and spring eye.

4. In a device of the character described and in combination with a vehicle frame and spring, bearing pins secured to said frame and extending inwardly toward each other, said spring having a spring eye extending over the inwardly projecting ends and said pin, anti-friction bearing members interposed between said spring eye and said bearing pins and closure means for closing the spaces between the outer ends of said spring eye and said pin ends.

5. In a device of the character described and in combination with a frame and spring, said spring having an eye thereon, and said frame having spaced apart portions extending over said eye, pin means secured to said spaced apart portions on said frame and extending into said spring eye, said pins means having reduced portions, anti-friction members interposed between said spring eye and said reduced portions.

6. In a device of the character described and in combination with a vehicle frame and spring, said spring having an eye thereon, means in said spring eye including spaced apart bearing cups for anti-friction members, pins secured to said frame and extending into said cups, anti-friction bearing members between said cups and pins and means for closing the spaces between said pins and surrounding cups.

7. In a device of the character described and in combination with a vehicle frame and spring, said frame having spaced apart portions with tapped apertures therein, bearing pins secured in said tapped apertures and having ends extending inwardly toward each other, said spring having an eye thereon and extending over said pin ends, anti-friction bearing members between said pin ends and spring eye and means for locking said pins in said frame.

8. In a device of the character described and in combination with a vehicle frame and spring, pins on said frame and extending inwardly toward each other, said spring having an eye thereon, said spring eye having bearing surfaces for anti-friction members therein, anti-friction bearing members interposed between said bearing surfaces in the spring eye and said bearing pins, the lines joining the points of contact between said anti-friction bearing members and said pin ends and said bearing surfaces in said spring eye converging outwardly, whereby said bearing members will take both radial and thrust loads for holding the spring eye in position against all but rotative movement relatively to said frame.

9. In a device of the character described and in combination with a vehicle frame and spring, said frame having spaced apart portions, bearing pins in screw threaded engagement with said spaced apart portions and extending inwardly toward each other, said spring having an eye thereon, means in said spring eye including spaced apart bearing cups extending over said pin ends, said pin ends being reduced at the ends for forming anti-friction bearing member raceways, anti-friction bearing members between said spaced apart cups and the bearing surfaces on said pin ends, means for closing the spaces between said bearing cups and pins and locking means for holding said pins in predetermined positions.

RAYMOND R. SEARLES.